Oct. 25, 1932.  F. OTTO  1,884,981
FLEXIBLE SUSPENSION FOR ROPE HOISTING EQUIPMENT
AND IN PARTICULAR FOR MINE CAGE WINDING
Filed Oct. 15, 1930
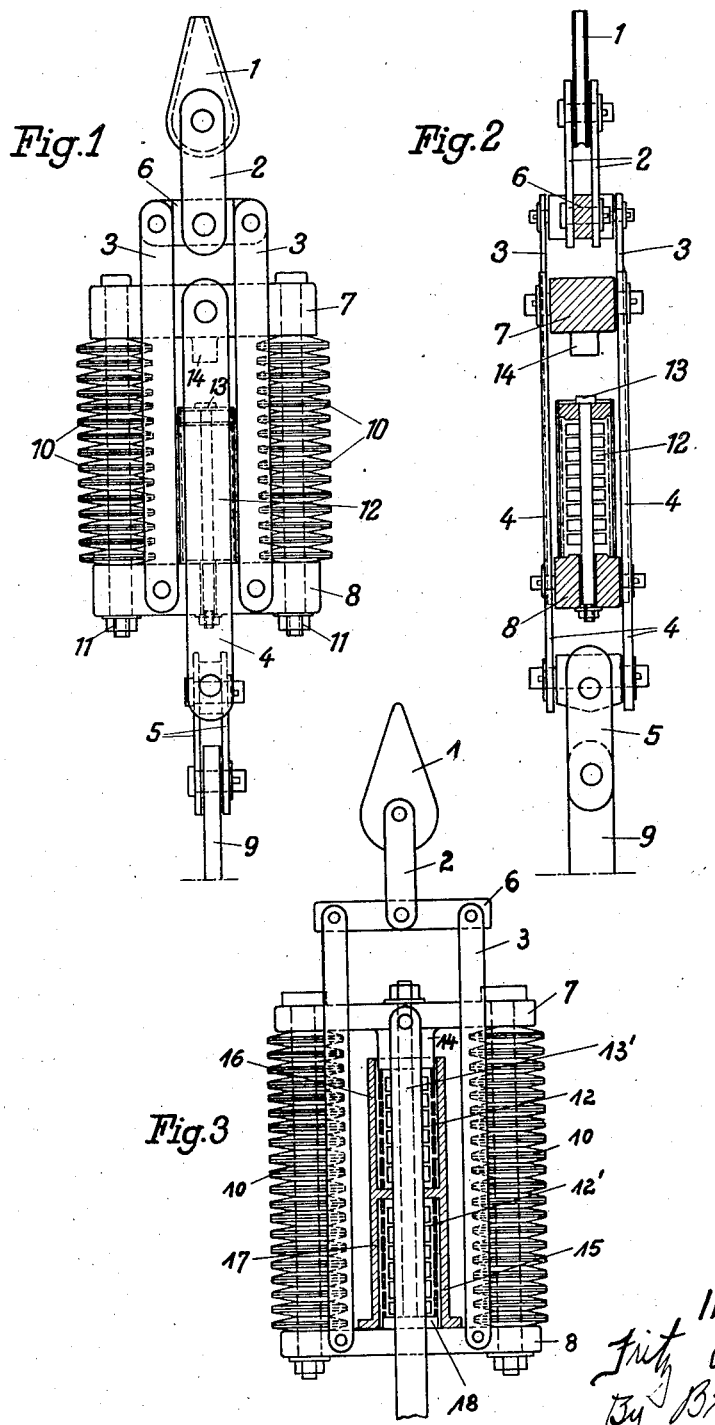
Inventor:
Fritz Otto
By Bilinger, atty.

Patented Oct. 25, 1932

1,884,981

UNITED STATES PATENT OFFICE

FRITZ OTTO, OF DUSSELDORF, GERMANY

FLEXIBLE SUSPENSION FOR ROPE HOISTING EQUIPMENT AND IN PARTICULAR FOR MINE CAGE WINDING

Application filed October 15, 1930, Serial No. 488,824, and in Germany October 24, 1929.

Attempts have frequently been made to use friction springs of the kind employed in railway-coach buffers for deadening the dangerous vibrations of winding ropes. Such springs may be used to advantage for the object in view, more especially because the necessary damping action is obtained by employing purely metallic elements, thereby avoiding the proposed damping effect produced by contrivances of the oil-piston type, damping effects of this kind being frequently undesirable in mine service.

The disadvantage of friction springs is that, owing to the constant load of the weight of the cage and rope, they are not able, or frequently not able, to bring the cage back again into its initial position, as the force exerted by the recoil is too small compared with the constant load. The spring is liable to jam under the maximum compression so that no spring tension whatever is available for the following vibrations. In addition, troubles are liable to arise by reason of the spring recoiling under such a high tension. Practical tests have proved that arrangements of this kind are useless.

According to the invention, this drawback is overcome by the provision of a further spring, which, however, is frictionless, in addition to purely metallic damping elements, such as friction buffers with friction segments or friction springs made adjustable in radial direction by means of wedges, the arrangement of this additional frictionless spring being such that the static load is substantially apportioned to the frictionless spring, while the friction springs are arranged to come into action not before the dynamic supplementary loads are brought into play. In this manner the vibration stresses proper, both positive and negative, can be taken under reduced spring tension and allayed, the frictionless springs supplying the necessary recoil force for establishing the static equilibrium state for the cage and maintaining it in this state.

In the accompanying drawing Fig. 1 is an elevation and Fig. 2 a side elevation of a construction embodied in the invention and adapted for one-sided deadening of the vibrations, while Fig. 3 is an elevation of a construction designed for double-sided deadening of the vibrations.

In the construction shown in Figs. 1 and 2 the intermediate gear, consisting of the rope dead-eye 1, the supporting straps 2, 3, 4, 5 with their connecting bolts and the crossbars 6, 7, 8, are arranged between the hoisting rope and the cage. The straps 5 are connected with the king post 9 of the cage, the latter not being shown. Between the crossbars 7 and 8 are interposed two columns of practically frictionless disc springs 10 which are kept under a certain degree of tension by the bolts 11. In addition, a friction spring column 12 is arranged between the two disc spring columns, the friction spring column being connected with the crossbar 8 by the bolt 13 and likewise kept under corresponding tension. The disc springs 10 are proportioned for the maximum static load when the cage is at the banking level. Now, if the intermediate gear is suspended between the rope and the cage, the disc springs 10 are compressed until the stop 14 on the crossbar 7 engages with the friction spring column 12, with the result that the springs 12 are compressed when the dynamic supplementary loads come into play.

While in the case of the first construction only the positive vibrations are allayed, both the positive and negative vibrations are taken and deadened by adopting the construction according to Fig. 3. To this end the casing 15, consisting of two chambers 16 and 17 situated one above the other, is attached to the crossbar 8. The friction spring 12 is accommodated in the chamber 16 and the friction spring 12' in the chamber 17, the springs being maintained under corresponding tension by the screw 13' guided in the crossbar 7. The positive vibrations are taken by the friction spring 12 as in Figs. 1 and 2, the crossbar 8 engaging with the friction spring 12 by means of the stop 14, while the negative vibrations are transmitted to the friction spring 12' by the head 18 of the screw 13'.

What I claim is:

Flexible suspension means for hoisting apparatus, comprising upper and lower cross bars, vertical rods connecting said cross bars and on which the lower cross bar is vertically movable, disc springs of minimum friction on said rods and extending from cross bar to cross bar, hoisting means connected to the lower cross bar, hoisting means connected to the upper cross bar, a bolt arranged between the rods, and movable vertically through the lower cross bar and a helicoidal friction spring column around said bolt and bearing between the head of said bolt and the said lower cross bar, said upper cross bar having a stop to bear on the head of the bolt and move the latter downwardly against the tension of the said helicoidal spring column when the upper cross bar is moved downwardly relatively to the lower cross bar by the load.

FRITZ OTTO.